US008184555B1

(12) United States Patent
Mouton et al.

(10) Patent No.: US 8,184,555 B1
(45) Date of Patent: May 22, 2012

(54) SPACEWIRE NETWORK MANAGEMENT

(75) Inventors: Christopher Andre Mouton, Los Angeles, CA (US); Ketao Liu, Cerritos, CA (US); Brian C. Thompson, Hermosa Beach, CA (US); Christopher J. Epple, Redondo Beach, CA (US); Richard Louis Singleton, Redondo Beach, CA (US)

(73) Assignee: The Boeing Company, Chicago, IL (US)

( * ) Notice: Subject to any disclaimer, the term of this patent is extended or adjusted under 35 U.S.C. 154(b) by 64 days.

(21) Appl. No.: 12/491,135

(22) Filed: Jun. 24, 2009

(51) Int. Cl.
*H04L 12/28* (2006.01)
*H04L 12/56* (2006.01)

(52) U.S. Cl. ........ 370/254; 370/351; 370/392; 370/397; 370/409

(58) Field of Classification Search ............ 370/254, 370/351, 389, 392, 396, 397, 400, 409
See application file for complete search history.

(56) References Cited

U.S. PATENT DOCUMENTS

| | | | | |
|---|---|---|---|---|
| 6,661,773 | B1 * | 12/2003 | Pelissier et al. | 370/228 |
| 2004/0177072 | A1 * | 9/2004 | Salminen et al. | 707/9 |
| 2005/0117526 | A1 * | 6/2005 | Melnik | 370/254 |
| 2006/0259204 | A1 * | 11/2006 | Jordan et al. | 701/1 |
| 2009/0276490 | A1 * | 11/2009 | Koning et al. | 709/203 |
| 2010/0219250 | A1 * | 9/2010 | Wang | 235/462.43 |
| 2010/0275244 | A1 * | 10/2010 | Lor et al. | 726/3 |

OTHER PUBLICATIONS

"Animated presentation to SpaceWire," University of Dundee Applied Computing, ESTEC/TOS-ETD section.
"Space Engineering: SpaceWire—Links, nodes, routers and networks," European Cooperation for Space Standardization, ECSS-E-50-12A, ESA Publications Division, Noordwijk, The Netherlands. Jan. 24, 2003. ftp://goes.gsfc.nasa.gov/pub/chesters/goesref/ECSS_Spacewire.pdf.

* cited by examiner

*Primary Examiner* — Ronald Abelson
(74) *Attorney, Agent, or Firm* — Vista IP Law Group LLP; Cynthia A. Dixon

(57) ABSTRACT

A system and method for SpaceWire network management are disclosed involving a network and a network manager (NM). The network includes a plurality of switches and a plurality of nodes. The switches and nodes do not have any preprogrammed knowledge of the network topology and/or of their unit identification (UID) code. In one or more embodiments, the network is a spacecraft communications network. In at least one embodiment, the method for managing the SpaceWire network comprises the network manager (NM) determining link connectivity of the network; verifying the switches are properly configured to allow for logical address routing; and verifying the nodes are configured to process, receive, and transmit data through the network. In some embodiments, the method further comprises determining newly added units, removed units, and/or unresponsive units in the network, and propagating this information through an active unit table.

17 Claims, 6 Drawing Sheets

Sample Switch Status Table — 410

| Topology Counter | Logical ID | Status |
|---|---|---|
| 0 | 32 | 2 |
| 1 | 33 | 2 |
| 2 | 34 | 2 |
| 3 | 35 | 2 |
| 4 | 36 | 1 |
| 5 | 37 | 2 |

Sample Node Status Table — 420

| Topology Counter | Logical ID | Status |
|---|---|---|
| 0 | 100 | 1 |
| 1 | 101 | 2 |
| 2 | 102 | 2 |
| 3 | 103 | 2 |
| 4 | 104 | 2 |
| 5 | 105 | 2 |

Status
0 - Failed
1 - Inactivate
2 - Active

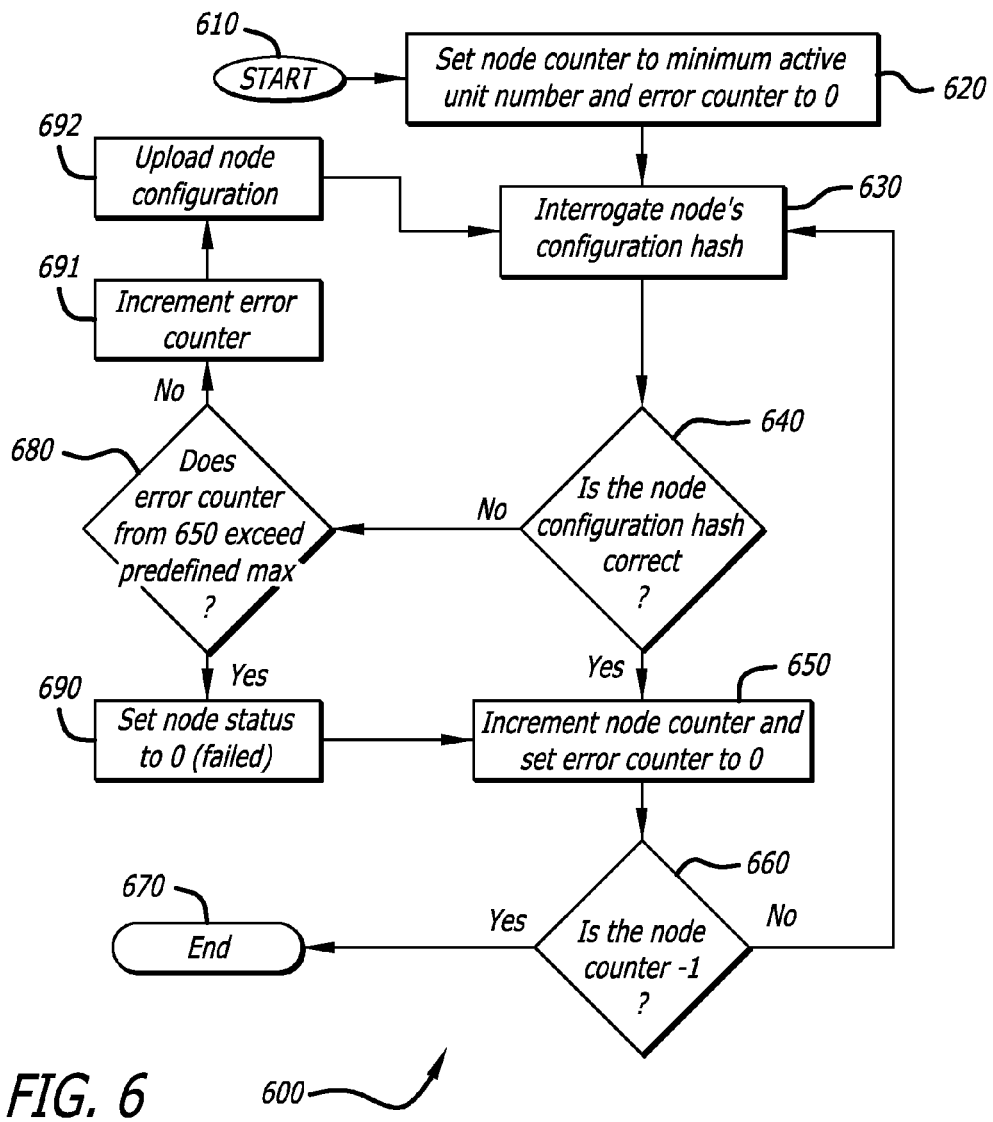

SPACEWIRE NETWORK MANAGEMENT

GOVERNMENT LICENSE RIGHTS

This disclosure was made with Government support under contract number FA 8808-04-C-0022 awarded by the Department of Defense. The U.S. Government has certain rights in this invention.

BACKGROUND

The present disclosure relates to network management. In particular, it relates to SpaceWire network management.

SUMMARY

The present disclosure relates to an apparatus, system, and method for SpaceWire network management. In one or more embodiments, the method for managing a SpaceWire network involves determining link connectivity of the network and verifying that switches in the network are properly configured to allow for logical address routing. The method further comprises verifying nodes in the network that are configured to process, receive, and transmit data through the network.

In one or more embodiments, the method further comprises determining newly added units in the network, and propagating, through an active unit table, information regarding the newly added units in the network. In some embodiments, the method further comprises setting a unit identification (UID) code for the newly added units. In addition, in at least one embodiment, the method further comprises setting an output timeout parameter (OPT) for the switches.

In some embodiments, the method for managing a SpaceWire network further comprises determining units removed from the network and determining unresponsive units, and propagating, through an active unit table, information regarding the units removed from the network and the unresponsive units. In at least one embodiment, the method further comprises determining newly added links in the network, and adjusting routing tables to reflect the newly added links. In some embodiments, the method further comprises determining links removed from the network, and adjusting the routing tables as required to compensate for the removed links.

In one or more embodiments, the SpaceWire network management method further comprises repairing any incorrectly set unit identification (UID) code. Also, in some embodiments, the method further comprises repairing any incorrectly set switch-output timeout parameter (OPT).

In some embodiments, the method for managing a SpaceWire network further comprises initializing the network with a network manager (NM) when units are added to an empty network simultaneously. In addition, in one or more embodiments, the method further comprises reading a switching table from each unit, and updating any switching tables that do not reflect a most current version of the switching table. Also, in at least one embodiment, the method further comprises reporting an inability to configure any switch by marking it as failed. In some embodiments, the marking of a switch as failed is performed by setting the switch's status to zero (0).

In one or more embodiments, the method for managing a SpaceWire network further comprises sending a new active unit table to any node having a missing or incorrect node configuration using logical addressing. Also, in some embodiments, the method further comprises reporting an inability to configure any node by marking it as failed. Additionally, in at least one embodiment, the marking of a node as failed is performed by setting the node's status to zero (0). In addition, the switches and nodes do not have any preprogrammed knowledge of the network topology and/or of their unit identification (UID) code. Also, in one or more embodiments, the network is a spacecraft communication network.

In some embodiments, the system for managing a SpaceWire network comprises a network and a network manager (NM). In at least one embodiment, the network includes a plurality of switches and a plurality of nodes. In one or more embodiments, the network manager (NM) determining link connectivity of the network; verifies the switches are properly configured to allow for logical address routing; and verifies the nodes are configured to process, receive, and transmit data through the network.

DRAWINGS

These and other features, aspects, and advantages of the present disclosure will become better understood with regard to the following description, appended claims, and accompanying drawings where:

FIG. 4 is an illustration of an example unit status table, in accordance with at least one embodiment of the present disclosure.

FIG. 6 is an illustration of a flow diagram of the node configuration verification loop, in accordance with at least one embodiment of the present disclosure.

FIG. 7 shows an example active unit table, in accordance with at least one embodiment of the present disclosure.

DESCRIPTION

The methods and apparatus disclosed herein provide an operative system for managing a network. Specifically, this system allows for SpaceWire network management. The system of the present disclosure provides a means for initializing and maintaining a SpaceWire network. In particular, the system allows for initialization of a network after a complete or partial reset of the network has been performed. Also, the system allows for detection and handling of a failed or partially failed node, link, and/or switch in the network.

The system of the present disclosure employs a network fault tree and a network manager (NM). The combination of these two features allows the system to handle and respond to many faults that may occur within the network. In particular, when managing the network, the network manager (NM) determining link connectivity, verifies the switches in the network are properly configured to allow for logical address routing, and verifies nodes in the network are configured to process, receive, and transmit data through the network.

The system of the present disclosure allows for the initialization of the network based on only information stored in the network manager (NM). For this system, the switches and nodes do not have any preprogrammed knowledge of the network topology and/or of their unit identification (UID) code. Failure of nodes, links, and/or switches in the network will be automatically detected by the network manager (NM). In response to any detected failures, the network manager (NM) will induce actions to mitigate the impact of the failure on the system.

In one or more embodiments, the methods and apparatus in the present disclosure are directed to managing a SpaceWire network. A SpaceWire network is a spacecraft communication network, which is typically employed in the bus portion of various commercial and/or government spacecraft. A SpaceWire network includes a plurality of switches and a plurality of nodes. Within the SpaceWire network, the plurality of nodes are connected through low-cost, low-latency, full-duplex, point-to-point serial links and packet switching wormhole routing routers. It should be noted that in alternative embodiments of the present disclosure, the disclosed methods and apparatus may be employed by various different types of networks other than SpaceWire networks including, but not limited to, redundancy networks.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Figure 1:
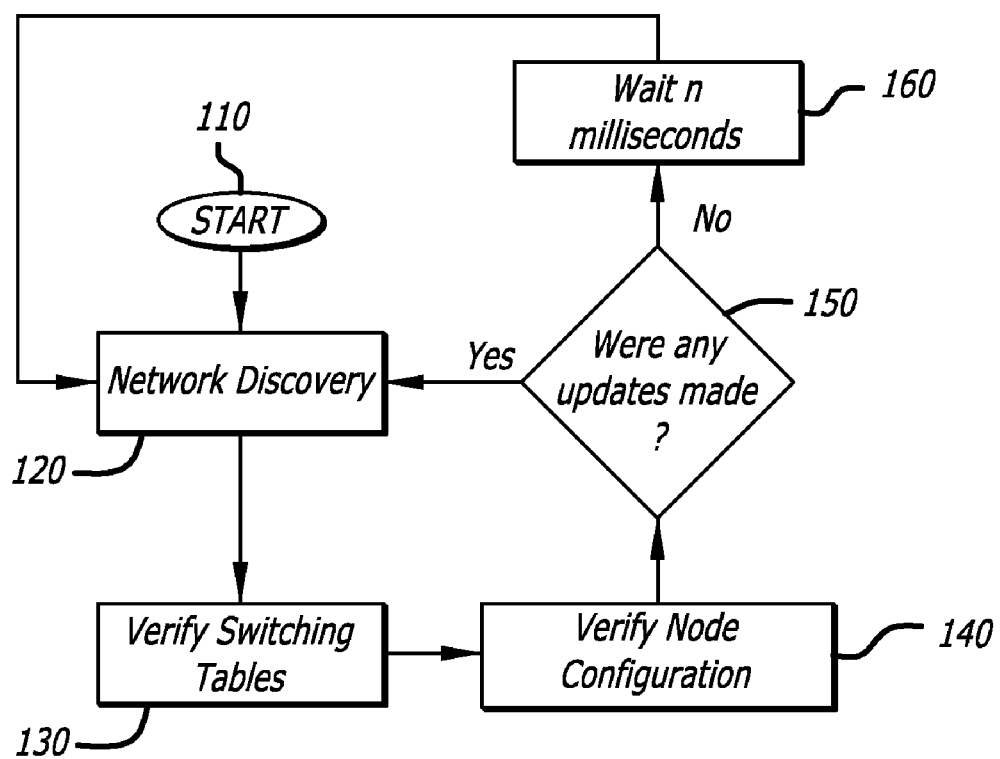
FIG. 1 is an illustration of a flow diagram of the primary network management loop, in accordance with at least one embodiment of the present disclosure.

FIG. 1 is an illustration of a flow diagram of the primary network management loop 100, in accordance with at least one embodiment of the present disclosure. This figure shows a general overview of the process flow of the disclosed SpaceWire management system. In this figure, it is shown that the primary network management loop 100 includes three main processes, which are: network discovery 120, switching table verification 130, and node configuration verification 140.

In one or more embodiments, after the start 110 of the primary network management loop 100, the network manager (NM) performs network discovery 120. The object of network discovery 120 is to determine which links and nodes in the network are active. Once the network manager (NM) determines which links and nodes are active, the network manager (NM) facilitates their connectivity to the network. In addition to determining active links and nodes in the network, during network discovery, the network manager (NM) will verify the unit identification (UID) code for every accessible unit within the network. If needed, the network manager (NM) will reset the unit identification (UID) for any unit it can access.

After network discovery 120 has been performed, the network manager (NM) will perform switching table verification 130. During the verification of the switching tables 130, the network manager (NM) will read the switching table from every accessible unit within the network. The network manager (NM) will update any unit switching table that does not reflect the most current version of that particular unit switching table.

In addition, during switching table verification 130, the network manager (NM) will report any inability to configure a switch by marking the switch as failed. In one or more embodiments, a switch is marked as failed by setting its status to zero (0). In some embodiments, there is no switching information for any failed or inactive units. As such, only logical addresses for active units are included in the routing tables. This allows for data packets that are addressed to inactive units to be immediately dropped from being routed within the network and, thus, those data packets will not added to unnecessary traffic in the network.

After the network manager has performed switching table verification 130, the network manager (NM) will perform node configuration verification 140. During this process, the network manager (NM) will review the configuration of each node within the network. The network manager (NM) will send a new active unit table to any node with a missing or incorrect node configuration using logical addressing. In addition, the network manager (NM) will report any inability to configure a node by marking the node as failed. In some embodiments, a node is marked as failed by setting its status to zero (0).

After the node configuration verification 140 is performed, the network manager (NM) queries if any updates were made 150 during any of the three main processes 120, 130, 140. Types of updates checked for include, but are not limited to, resetting the unit identification (UID) code for a unit, updating a unit switching table, marking a switch as failed, sending a new active unit table to a node, and marking a node as failed. If the network manager (NM) determines that any updates were preformed during any of those processes 120, 130, 140, the network manager (NM) will immediately proceed to repeat performance of the three processes 120, 130, 140. The network manager (NM) will continue immediately to repeat performance of the three main processes 120, 130, 140 until it has determined that no updates occurred during any of those processes. However, if the network manager (NM) determines that no updates were made 150 during any of the three main processes 120, 130, 140, the network manager (NM) will wait for a predetermined period of n milliseconds 160 before repeating performance of the three main processes 120, 130, 140.

Figure 2:
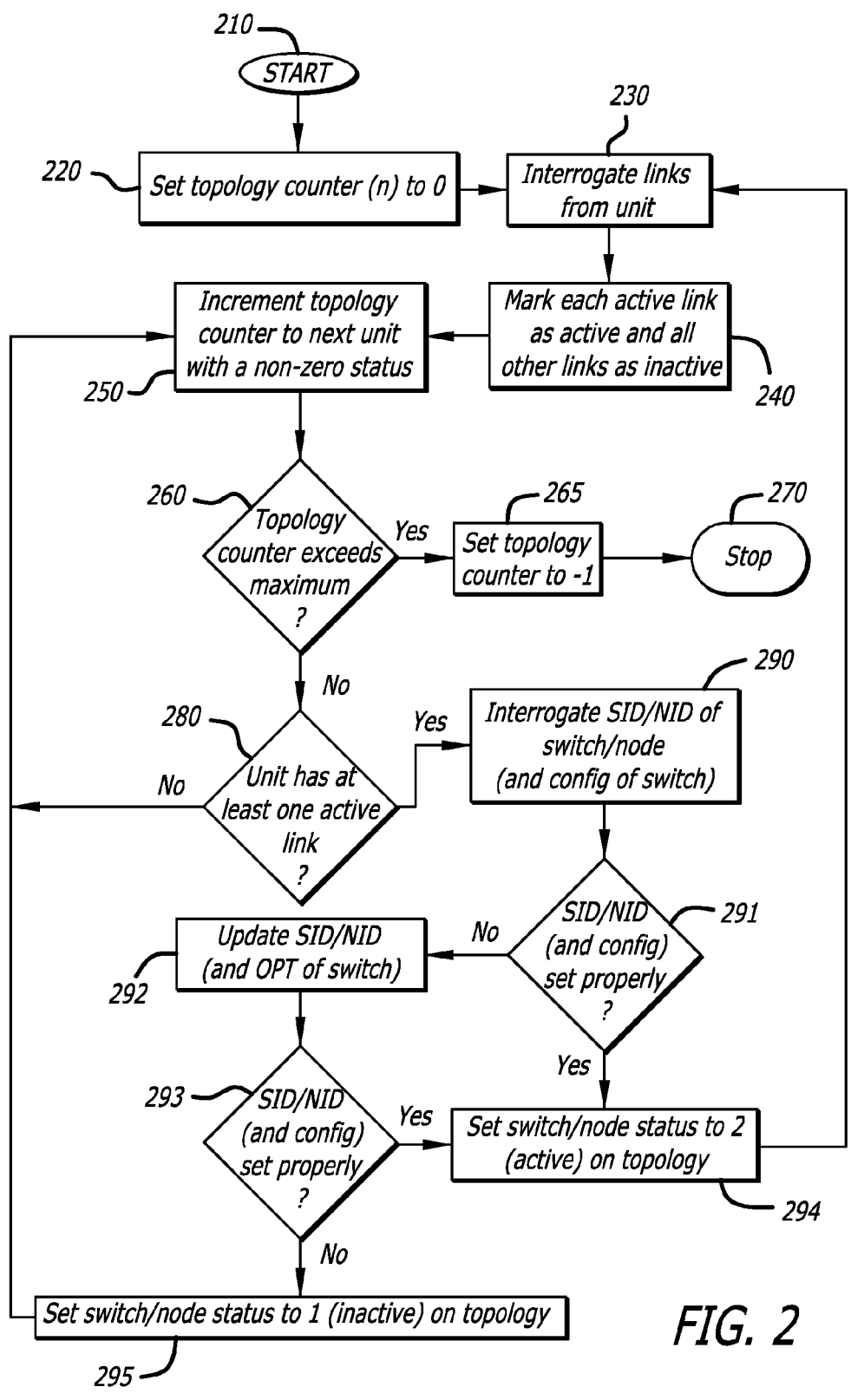
FIG. 2 depicts a flow diagram of the network discovery loop, in accordance with at least one embodiment of the present disclosure.

FIG. 2 depicts a flow diagram of the network discovery loop 200, in accordance with at least one embodiment of the present disclosure. The network manager (NM) utilizes the steps depicted in this flow diagram 200 to determine which links and nodes in the network are active. The network manager (NM) uses this information to facilitate connectivity of the active links and nodes to the network.

In one or more embodiments, after the start 210 of network discovery loop 100, the network manager (NM) sets the topology counter (n) to zero (0) 220. Each topology counter number corresponds to an individual unit within the network. After the network manager (NM) sets the topology counter (n) to zero (0) 220, the network manager (NM) interrogates links from the unit 230. During this interrogation, the unit under consideration, which is defined by the topology counter number, is queried to establish if there are any active links on the unit. In one or more embodiments, nodes will have one or two active links, and switches have one or more active links. In response to the query, the unit will reply with information about which links, e.g., unit ports, are active.

After the network manager (NM) interrogates links from the unit 230, the network manager (NM) updates the network topology by marking each active link as active, and all other links as inactive 240. Once the network manager (NM) has marked all of the links appropriately, the network manager (NM) increments the topology counter to the next unit having a non-zero status 250. This allows for the next unit with a status that is not set to zero (0) to be considered.

In one or more embodiments, the topology counter is defined first to proceed through the switches. After the final switch has been considered, the topology counter is set to consider the first node and, subsequently, to proceed through the remaining nodes. After all of the units within the network have been considered, the topology counter will be set to negative one (−1) 265.

After the network manager (NM) increments the topology counter to the next unit with a non-zero status 250, the network manager (NM) determines whether the topology counter exceeds the maximum number of units 260. If the network manager (NM) determines that the topology counter exceeds the maximum number of units, the network manager (NM) sets the topology counter to negative one (−1) 265. After the network manager (NM) sets the topology counter to negative one (−1) 265, the network manager (NM) will stop 270 the network discovery loop 200, and no additional processing will be performed.

However, if the network manager (NM) determines that the topology counter does not exceed the maximum number of units, the network manager (NM) determines whether the unit under consideration has at least one active link 280. If the network manager (NM) determines that the unit does not have at least one active link, the network manager (NM) will proceed to increment the topology counter to the next unit that has a non-zero status 250.

However, if the network manager (NM) determines that the unit under consideration does have at least one active link, the network manager (NM) will interrogate the switch identification code (SID) or node identification code (NID) of the switch or node, and will configure the switch accordingly 290. During this step, the network manager (NM) will query the node or switch that is currently being considered using path addressing. The path address is determined by the topology of the list of currently active links and switches.

In response to the query, the unit will return a switch identification code (SID), a node identification code (NID), or a null. In the case when a switch is under consideration, in addition to a switch identification code (SID) being returned, an output timer parameter (OPT) is also interrogated. In one or more embodiments, the output timeout parameter (OPT) of the switches is set to less than the function of the maximum discovery packet size in bytes and the discovery packet wait time.

After the network manager (NM) interrogates the switch identification code (SID) or node identification code (NID) of the switch or node, and configures the switch accordingly 290, the network manager (NM) determines whether the switch identification code (SID) or node identification code (NID) of the unit is properly set 291 to the expected unit identification (U ID) code, which is the logical address for the nodes. If the network manager (NM) determines, during step 291, that the switch identification code (SID) or node identification code (NID) of the unit is not properly set, the network manager (NM) will update the switch identification code (SID) or node identification code (NID) of the unit 292.

During step 292, the network manager (NM) sends the correct switch identification code (SID) or node identification code (NID) to the unit using path addressing and a destination unit identification (UID) code. If the unit under consideration is a switch, network manager (NM) sends the output timeout parameter (OPT) to the unit using path addressing immediately after the network manager (NM) sends the correct switch identification code (SID) to the unit.

After the network manager (NM) updates the switch identification code (SID) or node identification code (N ID) to the unit 292, the network manager (NM) determines whether the switch identification code (SID) or node identification code (NID) of the unit is properly set 293. This step 293 is identical to step 291 where the network manager (NM) determines whether the switch identification code (SID) or node identification code (NID) of the unit is properly set.

If the network manager (NM) determines, during step 293, that the switch identification code (SID) or node identification code (NID) of the unit is not properly set, the network manager (NM) will update the network topology to reflect that the current unit under consideration is inactive 295. In some embodiments, a unit is marked as inactive by setting the unit's status to one (1). When a unit has a status of one (1), the network manager (NM) will attempt to reconfigure the unit in the future.

Conversely, if the network manager (NM) determines, during step 291 or step 293, that the switch identification code (SID) or node identification code (NID) of the unit is properly set, the network manager (NM) will update the network topology to reflect that the current unit under consideration is active 294. In one or more embodiments, a unit is marked as active by setting the unit's status to two.

After the network manager (NM) has updated the network topology to reflect that the current unit under consideration is inactive 295, the network manager (NM) will proceed to increment the topology counter to the next unit that has a non-zero status 250. Also, after the network manager (NM) has updated the network topology to reflect that the current unit under consideration is active 294, the network manager (NM) will proceed to interrogate links from the unit under consideration 230.

Figure 3:
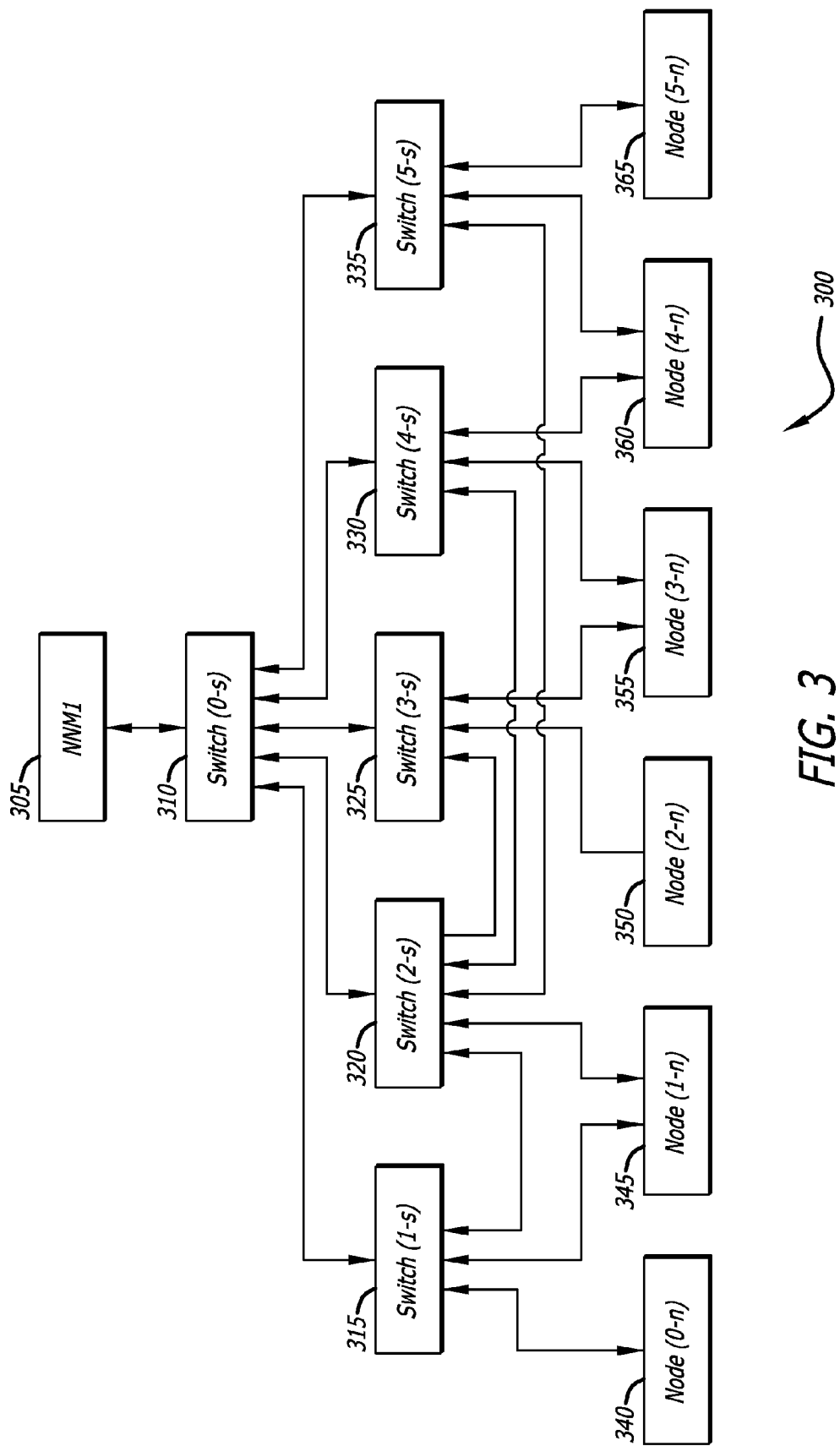
FIG. 3 is a diagram of an example network topology, in accordance with at least one embodiment of the present disclosure.

FIG. 3 shows a diagram of an example network topology 300, in accordance with at least one embodiment of the present disclosure. Unique topology counter numbers are assigned to individual units within the network, where the topology counter numbers are first assigned to the switches 310, 315, 320, 325, 330, 335 and, then, to the nodes 340, 345, 350, 355, 360, 365.

The topology counter number of each unit type is such that every unit of the same type with fewer minimum hops to the primary network node manager (NNM1) 305 has a lower topology number than every unit of the same type with more minimum hops to the primary network node manager (NNM1) 305. In this sense, the topology numbers are defined first by the units' distances to the primary network node manager (NNM1) 305 and, then, assigned sequentially to units with the same minimum distance. For example, as shown in FIG. 3, since switch 310 has fewer minimum hops to the primary network node manager (NNM1) 305 than switch 315, switch 310 is assigned a lower topology counter number than switch 315. As such, switch 310 has a lower topology counter number of (0−s) and switch 315 has a higher topology counter number of (1−s).

In one or more embodiments, all of the nodes of the network are situated on the same level of the network topology. In alternative embodiments of the present disclosure, the nodes of the network are situated on various different levels of the network topology.

FIG. 4 is an illustration of an example unit status table 400, in accordance with at least one embodiment of the present disclosure. The unit status table 400 shows the current switch status and the current node status. Based on the information received from the interrogation of each unit, during step 230, the switch status table 410 and the node status table 420 are updated to reflect the current status of the switches and the nodes in the network. A switch or node marked with a status of zero (0) will indicate that the switch or node is a failed unit. The network manager (NM) will not make any attempts to communicate with a failed unit. If a switch or node is marked with a status of one (1), the switch or node is considered to be an inactive unit. The network manager (NM) will make attempts to configure an inactive unit in the future. A switch or node marked with a status of two (2) will indicate that the switch or node is an active unit.

Figure 5:
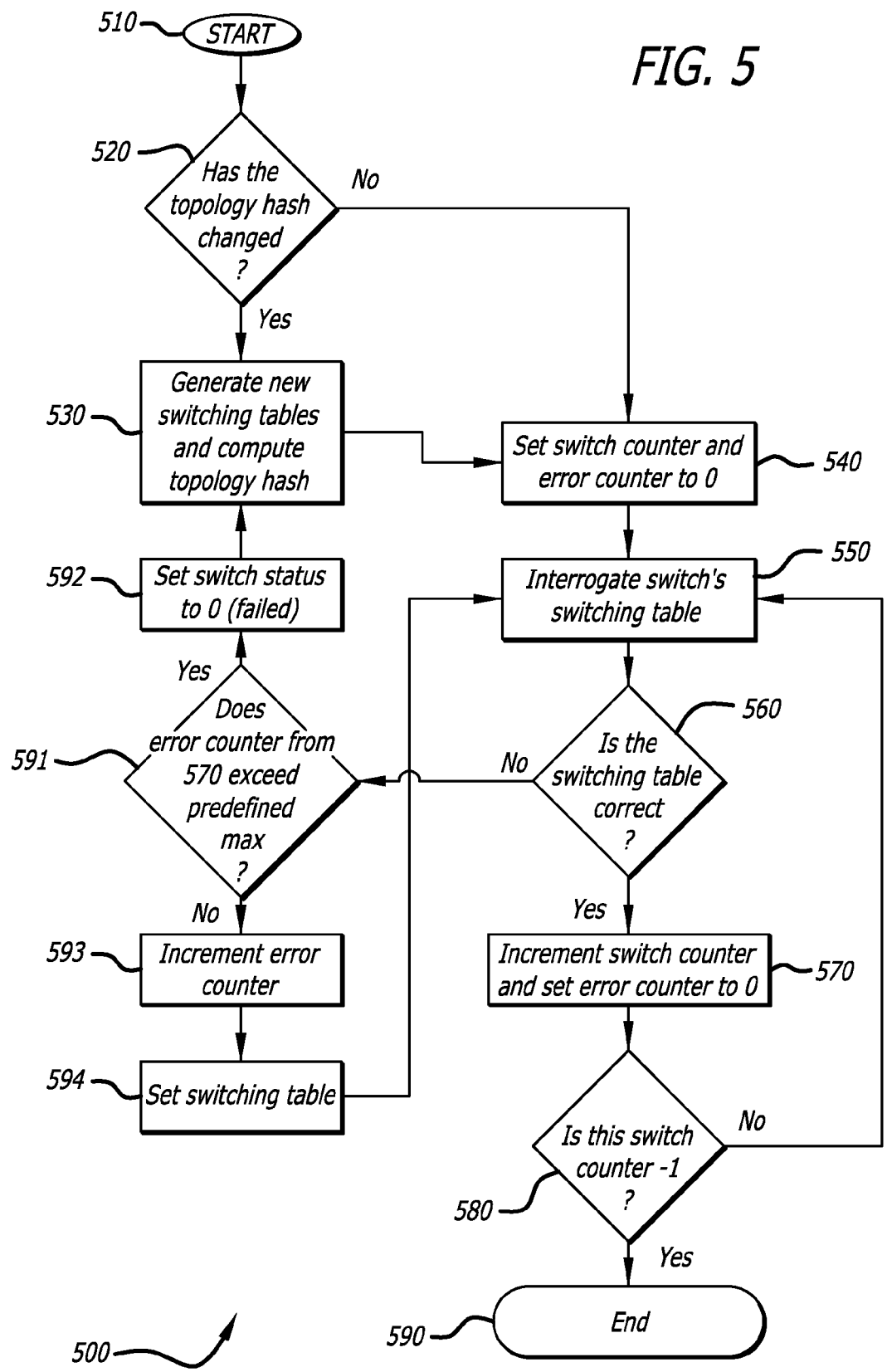
FIG. 5 depicts a flow diagram of the switching table verification loop, in accordance with at least one embodiment of the present disclosure.

FIG. 5 is a flow diagram of the switching table verification loop 500, in accordance with at least one embodiment of the present disclosure. The network manager (NM) utilizes the steps illustrated in this flow diagram 500 to verify and configure the switches in the network. The network manager (NM) reviews the switching table for each unit, and updates any unit's configuration that does not reflect the most current version of the switching table.

In one or more embodiments, the network manager (NM) will report an inability to configure a switch by marking it as failed. In some embodiments, the marking of the switch as failed is performed by setting the switch's status to zero (0). The network manager (NM) will not assign any switching information to any failed or inactive units. As such, only logical addresses for active units are included in the routing tables. Since only active units have logical addresses, data packets that are addressed to inactive units will be immediately dropped from being routed within the network and, thus, those data packets will not added to unnecessary traffic in the network.

In one or more embodiments, after the start 510 of the switching table verification loop 500, the network manager (NM) determines whether the topology hash value has changed 520. During step 520, the network manager (NM) compares the hash value of the current topology with the hash value stored with the switching tables. The topology hash value stored with the switching tables is a reflection of which topology was used to generate that particular set of switching tables.

If the network manager (NM) determines that the topology hash value has changed, the network manager (NM) will generate new switching tables and compute a new topology hash value 530. The new switching tables will be derived either from an automated generation scheme or from a database of preloaded possible switching tables. The use of an automated generation scheme will depend upon the details of the network design and the bandwidth limitations of the network.

If the new switching tables are generated from a database of possible switching tables, for choosing the new switching tables, the network manager (NM) will search the database for switching tables that match the current set of active links and switches in the network. If the network manager (NM) is unable to find switching tables that match the current set of active links and switches in the network, the network manager (NM) will send a message to a central station, which may be a ground station, instructing the central station to upload a new set of possible switching tables to the network.

However, if the network manager (NM) determines that the topology hash value has not changed, the network manager (NM) will set the switch counter and error counter to zero (0) 540. The switch counter increments through each active switch within the network, starting with the switches that are located the closest to the primary network node manager (NNM1). The error counter increments when an attempt to program a switch is made and fails.

After the network manager (NM) sets the switch counter and error counter to zero (0) 540, the network manager (NM) interrogates the switch's switching table 550. During this step, the network manager (NM) reads the switching table from the switch that is currently under consideration, which is defined by the current value of the switch counter.

After the network manager (NM) interrogates the switch's switching table 550, the network manager (NM) then determines whether the switching table is correct 560. During step 560, the network manager (NM) compares the switching table it read from the switch with the current switching table. If the network manager (NM) determines that the tables are the same, which indicates that the switch is correctly programmed, the network manager (NM) will increment the switch counter and set the error counter to zero (0) 570. During this step, the network manager (NM) will increment the switch counter to the next active switch. However, if all of the switches have already been considered, the network manager (NM) will set the switch counter to negative one (−1).

After the network manager (NM) has incremented the switch counter and set the error counter to zero (0) 570, the network manager (NM) determines if the switch counter is set to negative one (−1) 580. If the network manager (NM) finds that the switch counter is set to negative one (−1), the network manager (NM) will end 590 the switching table verification loop 500, and no additional processing will be performed.

However, if the network manager (NM) determines that the switch counter is not set to negative one (−1), the network manager (NM) will interrogate the switch's switching table 550. During step 550, the network manager (NM) reads the switching table from the switch that is currently under consideration, which is defined by the current value of the switch counter.

If the network manager (NM) determines, during step 560, that the switching table it read from the switch is not the same as the current switching table, the network manager (NM) will determine if the error counter value from 570 exceeds a predefined maximum 591. During this step, the network manager (NM) checks if the current error counter value from 570 is above a predefined maximum allowable value. If the network manager (NM) determines that error counter value from 570 exceeds the maximum allowable value, the network manager (NM) will set the switch status to zero (0) 592, thereby indicating that the switch is a failed unit. After the network manager (NM) sets the switch value to zero (0) 592, the network manager (NM) generates new switching tables and computes a new topology hash value 530.

If the network manager (NM) determines that the error counter value from 570 does not exceed the maximum allowable value, the network manager (NM) will increment the error counter 593. The network manager (NM) increments the error counter value to reflect the fact that the switching table was not properly set. After the network manager (NM) increments the error counter 593, the network manager (NM) sets the switching table 594. During this step, the network manager (NM) uploads a switching table to the switch that is under consideration. After the network manager (NM) sets the switching table 594, the network manager (NM) proceeds to interrogate the switch's switching table 550.

FIG. 6 depicts a flow diagram of the node configuration verification loop 600, in accordance with at least one embodiment of the present disclosure. The network manager (NM) uses the steps illustrated in this flow diagram 600 to verify and configure the nodes in the network. The network manager (NM) sends a new active unit table to any node with a missing or incorrect node configuration using logical addressing.

In at least one embodiment, the network manager (NM) will report the inability to configure a node by marking it as failed. In some embodiments, the marking of the node as failed is performed by setting the node's status to zero (0).

In one or more embodiments, after the start 610 of the node configuration verification loop 600, the network manager (NM) sets the node counter to a minimum active unit number and the error counter to zero (0) 620. The node counter increments through each active node in the network, starting with the nodes that are located closest to the primary network node manager (NNM1). During step 620, the network manager (NM) sets the node counter to the lowest active unit number. The error counter increments when an attempt to program a node is made and fails.

After the network manager (NM) sets the node counter to a minimum active unit number and the error counter to zero (0) 620, the network manager (NM) interrogates the node's configuration hash value 630. During this step, the network manager (NM) reads the configuration hash value from the node that is currently under consideration, which is defined by the current value of the node counter.

After the network manager (NM) determines the configuration hash value of the node that is under consideration, the network manager (NM) determines if the node configuration hash value is correct 640. For step 640, the network manager (NM) compares the configuration hash value that it has read from the node with the correct configuration hash value. If the network manager (NM) determines that the configuration hash values are the same, which indicates that the node is correctly configured, the network manager (NM) will increment the node counter and set the error counter to zero (0) 650. The network manager (NM) will increment the node counter to the next active node. However, if all of the nodes have already been considered, the network manager (NM) will set the node counter to negative one (−1).

After the network manager (NM) increments the node counter and sets the error counter to zero (0) 650, the network manager (NM) determines if the node counter is set to negative one (−1) 660. If the network manager (NM) determines that the node counter is set to negative one (−1), the network manager (NM) will end 670 the node configuration verification loop 600, and no additional processing will be performed. However, if the network manager (NM) determines that the node counter is not set to negative one (−1), the network manager (NM) will interrogate the node's configuration hash 630.

If the network manager (NM) determines, during step 640, that the node configuration hash value is not correct, the network manager (NM) will determine whether the error counter from 650 exceeds a predefined maximum value 680. During step 680, the network manager (NM) determines if the current error counter value from 650 is above a predefined maximum allowable value. If the network manager (NM) finds that error counter value from 650 exceeds the maximum allowable value, the network manager (NM) will set the node status to zero (0) 690, thereby indicating that the switch is a failed unit.

However, if the network manager (NM) finds that error counter value from 650 does not exceed the predefined maximum allowable value, the network manager (NM) increments the error counter 691. The network manager (NM) increments the error counter value to reflect the fact that the node configuration was not properly set. After the network manager (NM) increments the error counter 691, the network manager (NM) uploads the node configuration 692. During step 692, the network manager (NM) uploads node configuration parameters to the unit that is under consideration. The configuration parameters that are uploaded are comprised in an address table. After the network manager (NM) uploads the node configuration 692, the network manager (NM) proceeds to interrogate the node's configuration hash value 630.

FIG. 7 is an example active unit table 700, in accordance with at least one embodiment of the present disclosure. The active unit table 700 shows the logical address of the unit, the unit type, the unit number, and the unit state. In one or more embodiments, a unit that is marked with a state of zero (0) will indicate that the unit is a failed unit or an inactive unit. In some embodiments, a unit that is marked with a state of 1, 2, or 3, will indicate that the unit is a primary unit, secondary unit, or tertiary unit, respectively.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A method for managing a spacecraft communication network, the method comprising:
   determining link connectivity of the spacecraft communication network by determining which links and nodes in the spacecraft communication network are active and facilitating connectivity of the active links and the active nodes to the spacecraft communication network;
   verifying switches in the spacecraft communication network are properly configured to allow for logical address routing; and
   verifying the nodes in the spacecraft communication network are configured to process, receive, and transmit data through the spacecraft communication network.

2. The method of claim 1, wherein the method further comprises determining newly added units in the network; and
   propagating, through an active unit table, information regarding the newly added units.

3. The method of claim 2, wherein the method further comprises setting a unit identification (UID) code for the newly added units.

4. The method of claim 1, wherein the method further comprises setting an output timeout parameter (OPT) for the switches.

5. The method of claim 1, wherein the method further comprises determining units removed from the network and determining unresponsive units; and
   propagating, through an active unit table, information regarding the units removed from the network and the unresponsive units.

6. The method of claim 1, wherein the method further comprises determining newly added links in the network; and
   adjusting routing tables to reflect the newly added links.

7. The method of claim 1, wherein the method further comprises determining links removed from the network; and
   adjusting the routing tables as required to compensate for the removed links.

8. The method of claim 1, wherein the method further comprises repairing any incorrectly set unit identification (UID) code.

9. The method of claim 1, wherein the method further comprises repairing any incorrectly set switch output timeout parameter (OPT).

10. The method of claim 1, wherein the method further comprises initializing the network with a network manager (NM) when units are added to an empty network simultaneously.

11. The method of claim 1, wherein the method further comprises reading a switching table from each unit; and
    updating any switching tables that do not reflect a most current version of the switching table.

12. The method of claim 1, wherein the method further comprises reporting an inability to configure any switch by marking it as failed.

13. The method of claim 12, wherein the marking of a switch as failed is performed by setting the switch's status to zero (0).

14. The method of claim 1, wherein the method further comprises sending a new active unit table to any node having a missing or incorrect node configuration using logical addressing.

15. The method of claim 1, wherein the method further comprises reporting an inability to configure any node by marking it as failed.

16. The method of claim 15, wherein the marking of a node as failed is performed by setting the node's status to zero (0).

17. A system for managing a spacecraft communication network, the system comprising:

the spacecraft communication network, wherein the spacecraft communication network includes a plurality of switches and a plurality of nodes; and a network manager (NM), wherein the network manager (NM) is configured to determine link connectivity of the spacecraft communication network by determining which links and of the nodes in the spacecraft communication network are active and facilitating connectivity of the active links and the active nodes to the spacecraft communication network, verify the switches are properly configured to allow for logical address routing, and verify the nodes are configured to process, receive, and transmit data through the spacecraft communication network.

* * * * *